(12) United States Patent
Ichinokawa

(10) Patent No.: US 11,868,610 B1
(45) Date of Patent: Jan. 9, 2024

(54) CHANGEABLE VEHICLE DRIVER EVALUATION INTERFACE APPARATUS, SYSTEM, AND METHOD

(71) Applicant: HONDA MOTOR CO., LTD., Tokyo (JP)

(72) Inventor: Jumpei Ichinokawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/970,890

(22) Filed: Oct. 21, 2022

(51) Int. Cl.
*G06F 3/04886* (2022.01)
*G06F 3/04842* (2022.01)

(52) U.S. Cl.
CPC ...... *G06F 3/04886* (2013.01); *G06F 3/04842* (2013.01)

(58) Field of Classification Search
None
See application file for complete search history.

(56) References Cited

U.S. PATENT DOCUMENTS

| 8,010,283 | B2 * | 8/2011 | Yoshida | G09B 9/052 340/995.22 |
| 11,282,305 | B2 * | 3/2022 | Suzuki | G07C 5/0808 |
| 2008/0255722 | A1 * | 10/2008 | McClellan | B60R 25/102 340/439 |
| 2008/0319602 | A1 * | 12/2008 | McClellan | G07C 5/085 701/31.4 |
| 2013/0124078 | A1 * | 5/2013 | Yamakawa | G01C 21/3697 701/123 |
| 2015/0112546 | A1 * | 4/2015 | Ochsendorf | B60W 40/09 701/33.4 |
| 2016/0104486 | A1 * | 4/2016 | Penilla | G10L 15/02 704/232 |
| 2019/0291745 | A1 * | 9/2019 | Sikorski | B60W 50/14 |
| 2021/0178900 | A1 * | 6/2021 | Sudoh | B60K 37/06 |
| 2022/0055659 | A1 * | 2/2022 | Zhang | B60K 35/00 |
| 2022/0291888 | A1 * | 9/2022 | Kamezaki | B60K 37/06 |

FOREIGN PATENT DOCUMENTS

JP 2010-039138 2/2010

* cited by examiner

Primary Examiner — Amare Mengistu
Assistant Examiner — Sarvesh J Nadkarni
(74) Attorney, Agent, or Firm — Rankin, Hill & Clark LLP

(57) ABSTRACT

An interface device supports information transmission between an evaluation system that evaluates an operation by a user to an operation object and the user. The interface device includes: a display configured to display information to the user; an instruction input unit configured to receive an instruction by the user; and a processor configured to execute processing of displaying, on the display, a level display unit which displays a level of an evaluation standard for the operation by the user in the evaluation system, processing of switching display of the level display unit according to an up or down instruction of the level inputted to the instruction input unit, and processing of outputting evaluation standard level information indicating the level corresponding to the display of the level display unit to the evaluation system.

18 Claims, 9 Drawing Sheets

CHANGEABLE VEHICLE DRIVER EVALUATION INTERFACE APPARATUS, SYSTEM, AND METHOD

BACKGROUND OF THE INVENTION

Field of the Invention

The present invention relates to an interface device, an output method and a storage medium.

Description of the Related Art

In recent years, an approach of providing access to a sustainable transportation system considering even vulnerable people among traffic participants has been gaining momentum. Towards the realization, the focus is on research and development for further improving traffic safety and convenience through research and development regarding improvement of an operating technique of a vehicle or the like. As related art regarding the improvement of the operating technique, conventionally, a method of evaluating an operation performed by a user has been known. For example, Japanese Patent Laid-Open No. 2010-39138 discloses a device which outputs advice regarding driving of a vehicle to a driver and performs evaluation after driving of the vehicle is ended.

Now, when an operation by a user is evaluated, it is demanded to make it easy for the user to perform a required operation.

An object of the present application is to make an operation when evaluating the operation by a user easier in order to solve the problem described above, thereby contributing to developing a sustainable transportation system.

SUMMARY OF THE INVENTION

A first aspect for achieving the object described above is an interface device which supports information transmission between an evaluation system that evaluates an operation by a user to an operation object and the user, the interface device including: a display configured to display information to the user; an instruction input unit configured to receive an instruction by the user; and a processor configured to execute processing of displaying, on the display, a level display unit which displays a level of an evaluation standard for the operation by the user in the evaluation system, processing of switching display of the level display unit according to an up or down instruction of the level inputted to the instruction input unit, and processing of outputting evaluation standard level information indicating the level corresponding to the display of the level display unit to the evaluation system.

A second aspect for achieving the object described above is an output method which supports information transmission between an evaluation system that evaluates an operation by a user to an operation object and the user, the output method executing, by an interface device including a display configured to display information to the user and an instruction input unit configured to receive an instruction by the user, processing of displaying, on the display, a level display unit which displays a level of an evaluation standard for the operation by the user in the evaluation system, processing of switching display of the level display unit according to an up or down instruction of the level inputted to the instruction input unit, and processing of outputting evaluation standard level information indicating the level corresponding to the display of the level display unit to the evaluation system.

A third aspect for achieving the object described above is a storage medium storing a program which is to be executed by a processor of an interface device including a display configured to display information to a user and an instruction input unit configured to receive an instruction by the user and supports information transmission between an evaluation system that evaluates an operation by the user to an operation object and the user, the storage medium storing the program that executes, by the processor, processing of displaying, on the display a level display unit which displays a level of an evaluation standard for the operation by the user in the evaluation system, processing of switching display of the level display unit according to an up or down instruction of the level inputted to the instruction input unit, and processing of outputting evaluation standard level information indicating the level corresponding to the display of the level display unit to the evaluation system.

According to the configuration described above, since an operation by a user to an operation object is evaluated by a level corresponding to skill of the user, operations of various users with different operation ability can be appropriately evaluated. Then, since the user can select or specify the level by an easy operation, an experience of evaluating the operation ability of the user can be provided for the user with a small operation burden, thereby contributing to developing a sustainable transportation system.

DETAILED DESCRIPTION OF THE PREFERRED EMBODIMENTS

1. Configuration of Driving Evaluation System

Figure 1:
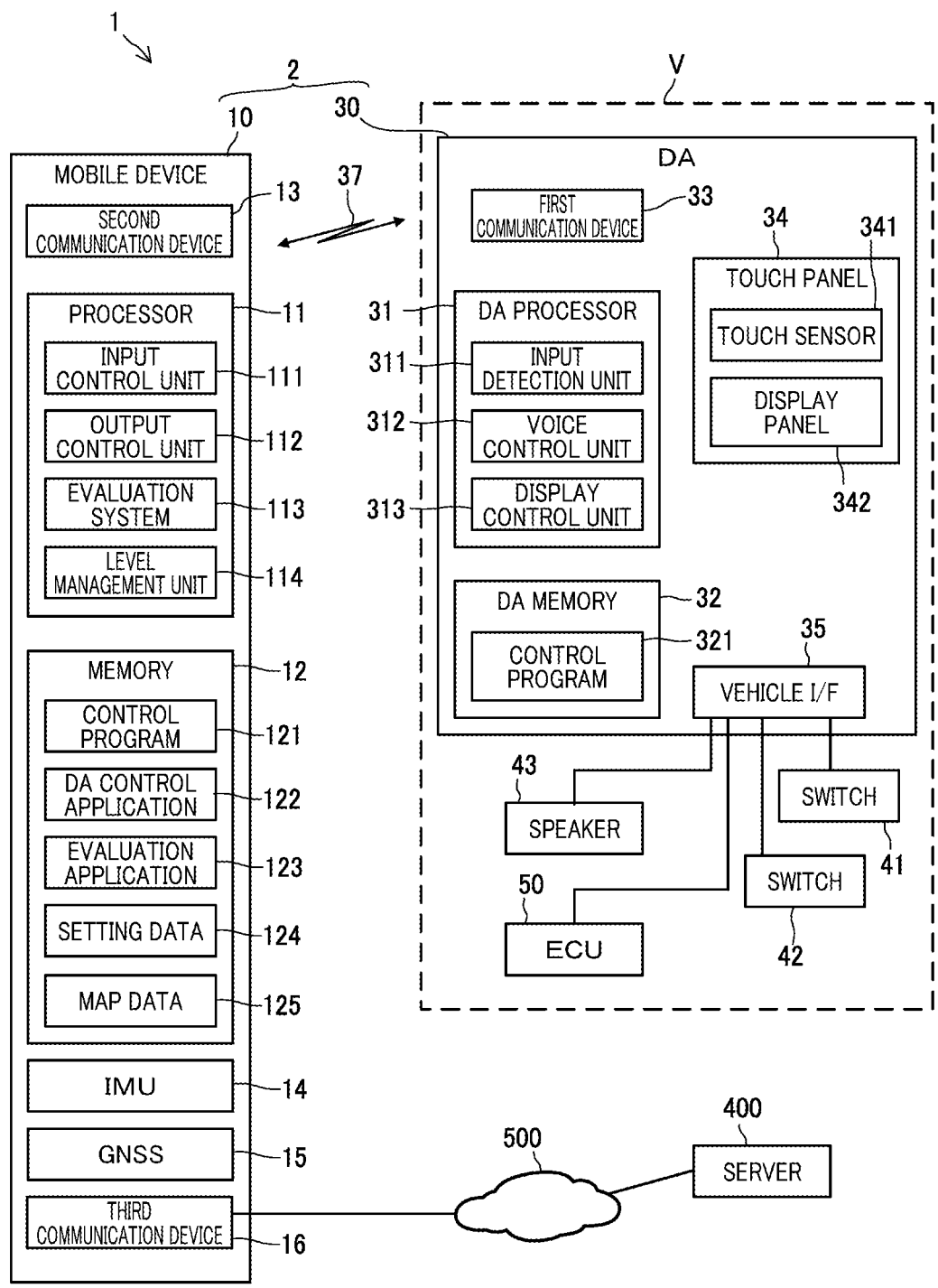
FIG. 1 is a diagram illustrating a configuration example of a driving evaluation system.

FIG. 1 is an explanatory diagram illustrating a configuration example of a driving evaluation system 1 of the present embodiment.

The driving evaluation system 1 is a system which evaluates an operation by a user to a vehicle V. The vehicle V is an example of an operation object. The operation object may be either a real object operated by the operation by the user or a virtual object such as a video or an image, and is a moving object which moves based on the operation by the user, for example. The present embodiment explains an example of applying the driving evaluation system 1 to the vehicle V as an example of the moving object.

The driving evaluation system 1 includes an interface device 2 provided with a mobile device 10 and display audio (hereinafter described as DA) 30. The DA 30 is an example of a display device loaded on the vehicle V, and includes a touch panel 34 as a display.

Figure 2:
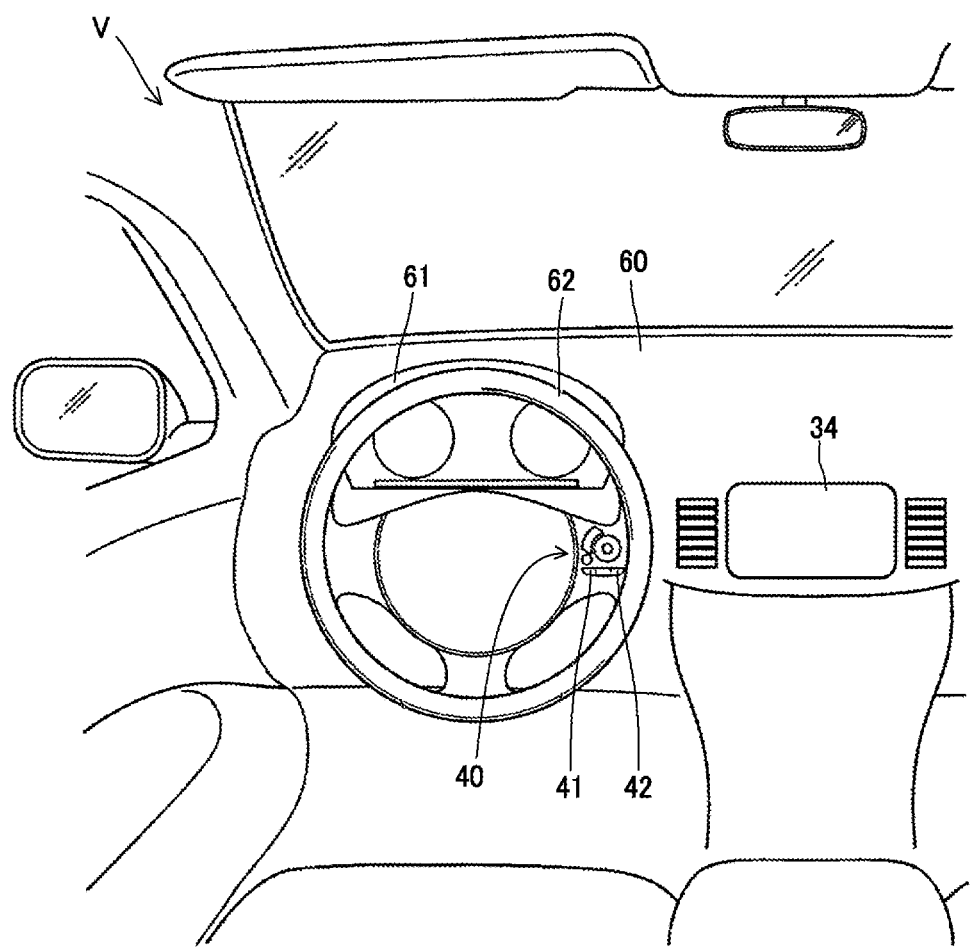
FIG. 2 is a diagram illustrating an arrangement example of display audio in a vehicle.

FIG. 2 is a diagram illustrating an arrangement example of the DA 30 in the vehicle V. In the arrangement example illustrated in FIG. 2, the touch panel 34 is embedded and arranged in an instrument panel 60 of the vehicle V. The touch panel 34 is positioned on a side part of a meter panel 61, and is positioned near a steering wheel 62. The touch panel 34 is arranged at a position to be easily operated and visually recognized by a user who is a driver driving the vehicle V. FIG. 2 illustrates a configuration that a steering switch unit 40 is arranged on the steering wheel 62. The steering switch unit 40 includes a plurality of switches 41 and 42, for example. The switch 41 and the switch 42 may be push-button type switches or may be capacitive sensors that detect a contact operation.

In the example illustrated in FIG. 2, the DA 30 is a device fixedly installed inside the vehicle V. The DA 30 may be a portable electronic device detachable from the vehicle V. For example, the DA 30 may be a portable car navigation device or a tablet type computer.

The DA 30 includes a DA processor 31, a DA memory 32, a first communication device 33, the touch panel 34 and a vehicle I/F 35.

The DA processor 31 is a CPU (Central Processing Unit), an MPU (Micro Processor Unit) or other arithmetic processing units. The DA memory 32 is a nonvolatile storage device which stores a program and data. The DA processor 31 corresponds to an example of a display processor.

The DA processor 31 controls individual units of the DA 30 by executing a control program 321 stored in the DA memory 32. The DA processor 31 may be an SoC (System on Chip) integrated with a non-illustrated volatile storage device and the DA memory 32.

The first communication device 33 (a transmitter/receiver, a communication circuit) executes communication with a second communication device 13 provided in the mobile device 10. The first communication device 33 and the second communication device 13 execute data communication via a communication line 37. The communication line 37 is a wired communication line configured by a communication cable, or a wireless communication line. The communication line 37 is, for example, a USB (Universal Serial Bus) cable or other data communication cables. In addition, for example, the communication line 37 may be a wireless communication line based on Bluetooth®, Wi-Fi® or other wireless communication standards.

The touch panel 34 includes a touch sensor 341 and a display panel 342. The display panel 342 is a display panel which displays images or videos according to control of the DA processor 31. The display panel 342 is, for example, an LCD (Liquid Crystal Display) panel or an organic EL (Electro-Luminescence) display panel. The touch sensor 341 is mounted on top of a surface of the display panel 342. When the user performs a touch operation on the surface of the display panel 342, the touch sensor 341 detects the touch operation and specifies a position where the touch operation is performed. The touch sensor 341 is configured by a pressure sensitive type sensor or a capacitance type sensor, for example.

The vehicle I/F (interface) 35 is a connection device (a connector, a communication device (a transmitter/receiver, a communication circuit)) connected to a device loaded on the vehicle V. In the configuration example in FIG. 1, the vehicle I/F 35 is connected to a speaker 43.

The DA processor 31 includes an input detection unit 311, a voice control unit 312 and a display control unit 313. They are functional units configured by software. They are configured by the DA processor 31 executing the control program 321, specifically.

The input detection unit 311 outputs data regarding the touch operation detected by the touch sensor 341 to the mobile device 10 through the first communication device 33.

The voice control unit 312 receives voice data transmitted by the mobile device 10, through the first communication device 33. The voice control unit 312 outputs voice from the speaker 43 based on the voice data received through the first communication device 33.

The display control unit 313 receives display data transmitted by the mobile device 10, through the first communication device 33. The display control unit 313 displays images and videos on the display panel 342 based on the display data received through the first communication device 33.

The touch panel 34 and the speaker 43 correspond to an example of an output unit.

The vehicle I/F 35 may be connected to the switches 41 and 42. The switches 41 and 42 are provided on the steering wheel 62 as illustrated in FIG. 2. When the switches 41 and 42 are connected to the vehicle I/F 35, the switch 41 corresponds to an example of an up instruction input unit, similarly to an up instruction button 221 to be described later. The switch 42 corresponds to an example of a down instruction input unit, similarly to a down instruction button 222. In this case, the input detection unit 311 outputs data indicating an operated switch to the mobile device 10 according to an operation of the switch 41 or the switch 42.

The vehicle I/F 35 may be connected to an ECU 50 (computer) loaded on the vehicle V. In this case, the vehicle I/F 35 is connected to a CAN bus installed in the vehicle V. When the ECU 50 is connected to the vehicle I/F 35, the DA processor 31 acquires data regarding the operation of the vehicle V by the user via the vehicle I/F 35. The data includes, for example, an operation amount of an accelerator pedal, a throttle opening degree, an operation amount of a brake pedal and a steering angle of the steering wheel 62. In this case, the input detection unit 311 outputs the data acquired from the ECU 50 to the mobile device 10.

The mobile device 10 includes a processor 11, a memory 12, the second communication device 13, an IMU 14, a GNSS 15 and a third communication device 16. The mobile device 10 is a portable electronic device and is, for example, a smartphone, a tablet type computer or a notebook type computer. The mobile device 10 may be a device fixed inside the vehicle V. The mobile device 10 includes a display, a speaker, a microphone and other devices in addition to the configuration illustrated in FIG. 1, although the illustrations and explanations are omitted.

The processor 11 is a CPU, an MPU or an arithmetic processing unit of another kind. The memory 12 is a nonvolatile storage device which stores a program and data. The processor 11 controls individual units of the mobile device 10 by executing a control program 121 stored in the memory 12. The processor 11 may be an SoC integrated with a non-illustrated volatile storage device and the memory 12.

The second communication device 13 (a transmitter/receiver, a communication circuit) executes the communication with the first communication device 33 provided in the DA 30 via the communication line 37.

The IMU (Inertial Measurement Unit) 14 is an example of a motion sensor provided in the mobile device 10. The IMU 14 is an integrated sensor unit including at least an acceleration sensor, and may include either a gyro sensor or a magnetic sensor. The IMU 14 outputs detected data to the processor 11.

The GNSS (Global Navigation Satellite System) 15 detects position information of the mobile device 10 and outputs data indicating the position information to the processor 11.

In a case where the processor 11 does not use the data outputted by the IMU 14 when performing processing illustrated in FIG. 6, FIG. 7 and FIG. 8 to be described later, the mobile device 10 may not include the IMU 14. It is the same for the GNSS 15.

The memory 12 stores the control program 121, a DA control application 122, an evaluation application 123, setting data 124 and map data 125. The control program 121 is a basic control program for the processor 11 to control the mobile device 10 and is, for example, an OS (operating system) of the mobile device 10. The DA control application 122 and the evaluation application 123 are application programs installed in the mobile device 10.

The processor 11 includes an input control unit 111, an output control unit 112, an evaluation system 113 and a level management unit 114. They are functional units configured by software. They are configured by the processor 11 executing the control program 121, specifically.

The processor 11 controls the individual units of the mobile device 10 by executing the control program 121. The processor 11 functions as the input control unit 111, the output control unit 112 and the level management unit 114 by executing the DA control application 122. The processor 11 functions as the evaluation system 113 by executing the evaluation application 123.

The input control unit 111 acquires the data transmitted by the DA 30 by a function of the input detection unit 311. The input control unit 111 outputs the acquired data to the evaluation system 113 and/or the level management unit 114. The output control unit 112 outputs data generated by the evaluation system 113 and data generated by the level management unit 114 to the DA 30 through the second communication device 13.

The evaluation system 113 evaluates a driving operation of the vehicle V by the user. The evaluation system 113 evaluates the driving operation based on the data indicating a motion of the mobile device 10 detected by the IMU 14 or the data acquired from the DA 30 by the input control unit 111. For example, the evaluation system 113 estimates the motion of the vehicle V on which the mobile device 10 is installed or loaded, from the data detected by the IMU 14. When the user performs an operation, the evaluation system 113 evaluates the operation. The evaluation system 113 gives a high evaluation when the operation by the user is a good operation or is close to a good operation, and gives a low evaluation when the operation by the user is a bad operation or is close to a bad operation. For example, the evaluation system 113 calculates an evaluation score indicating whether or not the driving operation by the user is close to a desirable operation, based on the motion of the vehicle V. The evaluation scores have an upper limit and a lower limit, the higher evaluation score means that the operation by the user is highly evaluated, and the evaluation score of the upper limit is given to the best operation. In addition, low evaluation scores mean that the operation by the user is lowly evaluated. The evaluation system 113 may evaluate the driving operation using the data acquired from the ECU 50 by the mobile device 10. For example, the evaluation system 113 may perform the evaluation utilizing the data detected by a non-illustrated IMU connected to the ECU 50. For example, the evaluation system 113 may perform the evaluation utilizing the data acquired from the ECU 50 by the mobile device 10, such as the operation amount of the accelerator pedal, the throttle opening degree, the operation amount of the brake pedal and the steering angle of the steering wheel 62.

The evaluation system 113 can set a level of evaluating the driving operation. The evaluation system 113 can set levels in two or more stages for example, and evaluates the driving operation at the level selected from the levels in the two or more stages. As an example, in the evaluation system 113 of the present embodiment, from the levels in five stages that are levels 1, 2, 3, 4 and 5, one level can be selected and set. For the levels 1-5, the level is lower for a smaller number and the level is higher for a larger number. From this point of view, the level can be referred to as a grade.

The low level is suitable for evaluating a user inexperienced in the driving operation. The high level is suitable for evaluating an experienced user with a high degree of skill in the driving operation. The evaluation system 113 has an evaluation standard corresponding to each level. When the level is set, the evaluation system 113 evaluates the driving operation of the user by using the evaluation standard corresponding to the set level.

In the case where the evaluation score is higher than a predetermined standard when the driving operation by the user is evaluated, the evaluation system 113 may change the set level to the level of one or two stages higher. Thus, when the driving operation by the user improves, the level of the evaluation system 113 is raised accompanying the improvement of the operation. In the case where the evaluation score is lower than the predetermined standard when the driving operation by the user is evaluated, the evaluation system 113 may change the set level to the level of one or two stages lower.

The evaluation system 113 executes the evaluation of the driving operation by the user at every preset time, every time the vehicle V moves for a preset amount, or every time the operation is performed for a preset number of times. For example, the evaluation system 113 may perform the evaluation for all the operations as targets after the vehicle V starts traveling until the vehicle V stops. In this case, for example, a traveling start of the vehicle V is when a vehicle speed of the vehicle V becomes a first reference speed or higher, and a stop of the vehicle V is when the vehicle speed of the vehicle V becomes a second reference speed or lower.

The evaluation system 113 outputs advice to the user according to a result of evaluating the driving operation by the user. The advice to the user is outputted by display or voice. For example, the evaluation system 113 outputs data regarding the advice, and the output control unit 112 generates display data or voice data of the advice and outputs the data to the mobile device 10. The mobile device 10 updates the display of the touch panel 34 based on the display data generated by the output control unit 112, or outputs the voice by the speaker 43 based on the voice data generated by the output control unit 112.

In the evaluation system 113, a kind of the operation or a type of the operation to be a target of the evaluation among the driving operations performed by the user can be set. The kind or type of the operation includes, for example, an accelerator operation, a brake operation, and a steering operation. When the target of the evaluation is set, the evaluation system 113 calculates the evaluation score based on the evaluation standard for each level, for the set evaluation.

The level management unit 114 sets the level of the evaluation to the evaluation system 113. When an operation of instructing level change is performed by the touch panel 34 or the switches 41 and 42, the level management unit 114 changes the level set in the evaluation system 113 to a higher level or a lower level corresponding to the operation. When the level of the evaluation system 113 is changed, the level management unit 114 updates the display of an indicator 230 displayed by the touch panel 34, as to be described later.

In addition, the level management unit 114 sets the kind or type of the operation to the evaluation system 113 according to the operation by the user.

In the evaluation system 113, the kind or type of the operation which is an evaluation target and an initial value for the level of the evaluation are set beforehand.

The third communication device 16 (a transmitter/receiver, a communication circuit) is connected to a communication network 500, and executes the communication with a server 400 through the communication network 500. The communication network 500 may be a data communication network, and is exemplified by a wide area communication network including a public network and a LAN (Local Area Network) or the like. The server 400 is a server computer capable of executing the data communication mutually with the mobile device 10. The server 400 may be one server computer, or a plurality of server computers may behave as the server 400 by performing distributed processing.

The server 400 provides the mobile device 10 with the DA control application 122 and the evaluation application 123, for example. In this case, the mobile device 10 can download the DA control application 122 and the evaluation application 123 from the server 400 and install them. In addition, the mobile device 10 can update the DA control application 122 and the evaluation application 123 based on data downloaded from the server 400.

2. Configuration of User Interface

Figure 3:
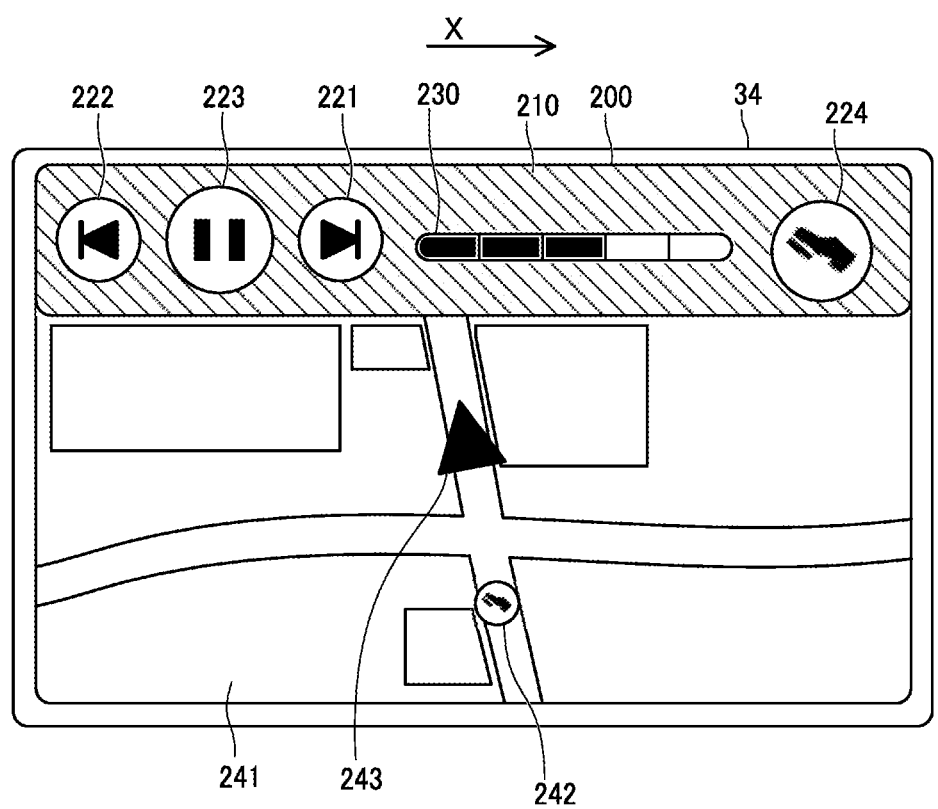
FIG. 3 is a diagram illustrating a display example of the display audio.
Figure 4:
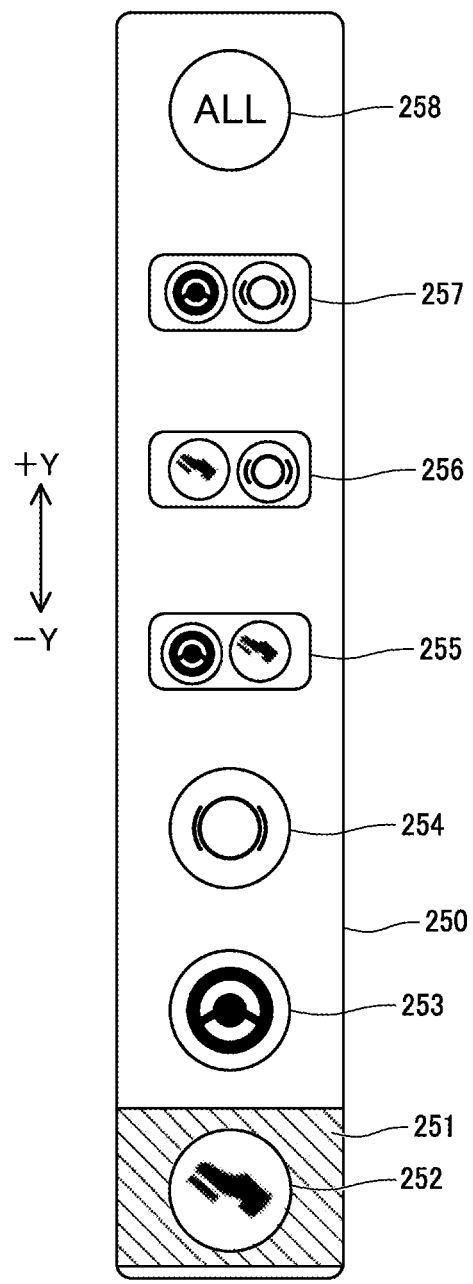
FIG. 4 is a diagram illustrating a display example of the display audio.

FIG. 3 and FIG. 4 are diagrams illustrating a display example of the DA 30.

The display example illustrated in FIG. 3 is displayed when the evaluation system 113 is operated according to the operation by the user. In the display example, a screen 200 is displayed in an almost entire displayable area of the touch panel 34. The screen 200 is a screen for the evaluation and corresponds to an example of one screen of the present invention.

At an upper part of the screen 200, an input area 210 is arranged. The input area 210 is an area where instruction input can be received by the touch operation by the user.

In the input area 210, the up instruction button 221, the down instruction button 222 and an execution instruction input unit 223 are arranged. The up instruction button 221, the down instruction button 222 and the execution instruction input unit 223 configure an instruction input unit. The up instruction button 221 corresponds to an example of the up instruction input unit, and the down instruction button 222 corresponds to an example of the down instruction input unit.

The up instruction button 221 and the down instruction button 222 receive input of an instruction to change the level of the evaluation set in the evaluation system 113. The up instruction button 221 is the instruction input unit for inputting the instruction to raise the level of the evaluation, that is, to change the level to a higher level. The down instruction button 222 is the instruction input unit for inputting the instruction to lower the level of the evaluation, that is, to change the level to a lower level.

The execution instruction input unit 223 is the instruction input unit for instructing the start and stop of the evaluation by the evaluation system 113. Every time the user performs the operation of touching a display position of the execution instruction input unit 223, the instruction to start and stop the evaluation in the evaluation system 113 is received.

In the input area 210, the indicator 230 is arranged. The indicator 230 is a display object which indicates the level set in the evaluation system 113. The indicator 230 is a bar displayed in a crosswise direction in the figure, and the display of the indicator 230 extends in a right direction when the level is higher. Here, an extending direction of the indicator 230 is defined as an X direction. The X direction corresponds to an example of a first direction. However, an aspect of the object displayed by the indicator 230 is not limited thereto. The aspect of the object is, for example, a shape, a size, a pattern and a color of the object. That is, the display object which indicates the level is not limited to a bar shape like the indicator 230, and for example, text indicating the level may be additionally displayed on a bar similar to the indicator 230. Further, for example, the indicator 230 may be a display object in a circle graph shape, or may be a bar which extends in a direction crossing the X direction. The indicator 230 is an example of a level display unit.

A length of the bar of the indicator 230 becomes short when the level of the evaluation in the evaluation system 113 is lowered, and becomes long when the level of the evaluation is raised. Since a position of a left end of the bar of the indicator 230 is fixed, the bar becomes long in the X direction and becomes short in a direction opposite to the X direction. In the example in FIG. 3, the indicator 230 is sectioned into five areas to extend and contract in five stages. A state where the bar of the indicator 230 is shortest indicates the level 1, and the state where the bar is longest indicates the level 5.

The up instruction button 221 and the down instruction button 222 are configured by icons corresponding to extending and contracting directions of the bar of the indicator 230. For example, the up instruction button 221 is an image or an illustration of an arrow indicating the extending direction of the bar of the indicator 230. The down instruction button 222 is an image or an illustration of an arrow indicating a shortening direction of the bar of the indicator 230. The up instruction button 221 and the down instruction button 222 are arranged in accordance with the extending direction of the bar of the indicator 230. That is, the up instruction button 221 is positioned more in the extending direction of the bar of the indicator 230, that is, the X direction, than the down instruction button 222.

The indicator 230 is a bar which extends in the X direction and contracts in the direction opposite to the X direction. Then, the up instruction button 221 and the down instruction button 222 are graphical user interfaces (GUIs) including the icons corresponding to the extending and contracting directions of the bar of the indicator 230. Such a combination and arrangement of the up instruction button 221, the down instruction button 222 and the indicator 230 enable an intuitive operation by the user.

In the configuration in FIG. 3, the indicator 230 has the extending and contracting bar, and the up instruction button 221 is the icon indicating the extending direction of the bar. Therefore, the user can intuitively recognize an operation method when wanting to raise the level of the evaluation by looking at the icon of the up instruction button 221 and the indicator 230.

In the configuration in FIG. 3, the indicator 230 has the extending and contracting bar, and the down instruction button 222 is the icon indicating the contracting direction of the bar. Therefore, the user can intuitively recognize an operation method when wanting to lower the level of the evaluation by looking at the icon of the down instruction button 222 and the indicator 230.

The execution instruction input unit 223 is arranged between the up instruction button 221 and the down instruction button 222. The position of the execution instruction input unit 223 is not limited, but since the execution instruction input unit 223 is positioned between the up instruction button 221 and the down instruction button 222, a contrast of the up instruction button 221 and the down instruction button 222 becomes clear. Thus, the user can more intuitively perform the operation.

Further, in the input area 210, to the up instruction button 221 and the down instruction button 222, the indicator 230 is arranged to be lined up in the X direction. More specifically, the up instruction button 221, the down instruction button 222 and the indicator 230 are arranged to be lined up on a straight line. Therefore, the user easily understands correspondence of the up instruction button 221 and the down instruction button 222 and the indicator 230. Thus, the user can more intuitively perform the operation of changing the level of the evaluation.

In the input area 210, an operation type input unit 224 is arranged. The operation type input unit 224 is the instruction input unit which receives the instruction input which specifies the kind of the evaluation. In the present embodiment, as an example, the accelerator operation, the brake operation, the steering operation and the combinations thereof can be set as the kind of the evaluation.

When the touch operation to the operation type input unit 224 is performed, the mobile device 10 and the DA 30 spread a setting screen on the screen 200. A display example of the screen is illustrated in FIG. 4.

FIG. 4 illustrates the display example of an operation type selection area 250 displayed on the touch panel 34. The operation type selection area 250 is displayed on top of the screen 200, for example. In the operation type selection area 250, icons 252-258 indicating the kinds of the operation to be set to the evaluation system 113 are arranged. The icon 252 indicates the accelerator operation. The icon 253 indicates the steering operation. The icon 254 indicates the brake operation. The icon 255 indicates the combination of the steering operation and the accelerator operation, the icon 256 indicates the combination of the accelerator operation and the brake operation, and the icon 257 indicates the combination of the steering operation and the brake operation. The icon 258 indicates the combination of all of the steering operation, the brake operation and the accelerator operation.

In the operation type selection area 250, a selection display 251 for selecting the type of the operation to be set to the evaluation system 113 is arranged. The selection display 251 is movable in directions indicated by signs +Y and −Y in the figure. In the operation type selection area 250, the selection display 251 and the icons 252-258 may be relatively movable. For example, a display position of the selection display 251 may be fixed and the icons 252-258 in the operation type selection area 250 may be movable in the +Y direction and the −Y direction.

The user performs the operation of superimposing the selection display 251 on a desired icon among the icons 252-258. The operation is a touch operation or a drag operation for example. The mobile device 10 and the DA 30 set the type of the operation or the combination of the types of the operation corresponding to the icon on which the selection display 251 is superimposed as the target of the evaluation in the evaluation system 113.

Returning to FIG. 3, in an area excluding the input area 210 on the screen 200, a map 241 is displayed. The area where the map 241 is displayed may be referred to as a map area or a second area. The map 241 is a map including a current position of the vehicle V. The output control unit 112 of the mobile device 10 refers to the map data 125, generates an image of the map 241 including the current position detected by the GNSS 15, and displays the image on the touch panel 34. When the mobile device 10 is installed or loaded on the vehicle V, the position detected by the mobile device 10 can be considered as the position of the vehicle V. In addition, when the mobile device 10 can acquire data indicating the current position from a car navigation system loaded on the vehicle V via the vehicle I/F 35, the output control unit 112 may display the map 241 based on the data acquired from the mobile device 10.

In the map 241, an evaluation position icon 242 indicating the position where the user has performed the evaluated operation and a current position icon 243 indicating the current position of the vehicle V are arranged. The evaluation position icon 242 indicates the position where the driving operation evaluated by the evaluation system 113 has been performed, or the position where the driving operation for which a predetermined evaluation score is given by the evaluation system 113 has been performed. For example, the evaluation position icon 242 indicates the position where the driving operation for which the evaluation score higher than a first threshold or the evaluation score lower than a second threshold is given by the evaluation system 113 has been performed. The evaluation position icon 242 may be an icon including an image or an illustration indicating the type of the evaluated driving operation. The evaluation position icon 242 corresponds to an example of a display object indicating the position where the operation has been performed. The first threshold and the second threshold are preset values, and the first threshold is the value indicating the evaluation higher than the second threshold.

Figure 5:
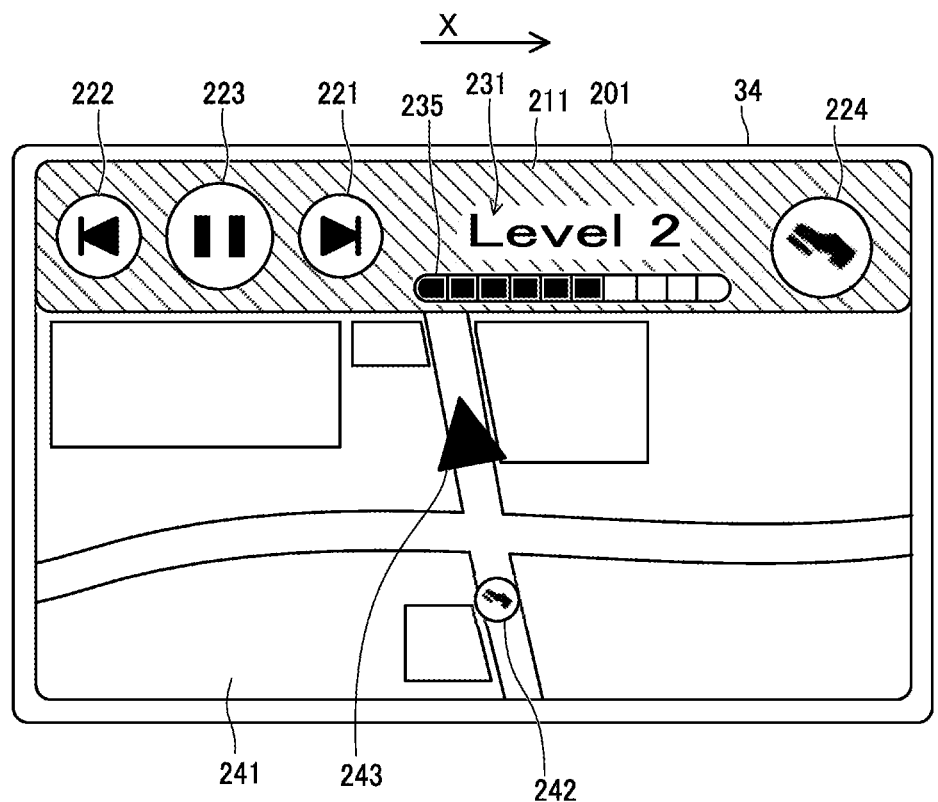
FIG. 5 is a diagram illustrating another display example of the display audio.

FIG. 5 is a diagram illustrating another display example of the DA 30.

FIG. 5 illustrates a screen 201 as a modification of the screen 200 illustrated in FIG. 3. A timing at which the screen 201 is displayed and the operation by the user while the screen 201 is displayed are similar to those for the screen 200. The screen 201 is the screen for the evaluation similarly to the screen 200, and corresponds to an example of one screen of the present invention.

At the upper part of the screen 201, an input area 211 is arranged. The input area 211 is an area where the instruction input can be received by the touch operation by the user. The input area 211 includes the up instruction button 221, the down instruction button 222, the execution instruction input unit 223 and the operation type input unit 224. The up instruction button 221, the down instruction button 222, the execution instruction input unit 223 and the operation type input unit 224 are arranged in the input area 211 similarly to the input area 210.

On the screen 201, the map 241 is displayed. A display mode of the map 241 and the evaluation position icon 242 and the current position icon 243 superimposed and displayed on the map 241 are similar to those for the screen 200 illustrated in FIG. 3.

In the input area 211, a level display unit 231 is arranged. The level display unit 231 is a display object indicating the level set in the evaluation system 113. The level display unit 231 is a character string indicating the set level by text. While the level display unit 231 indicates "level 2" in the example in FIG. 5, the display of the level display unit 231 is updated to "level 1" or "level 3" accompanying the change of the level set in the evaluation system 113.

In the input area 211, an evaluation indicator 235 is arranged. The evaluation indicator 235 is a display object indicating the result of evaluating the operation by the user by the evaluation system 113. The evaluation indicator 235 is arranged below the level display unit 231, for example.

The evaluation indicator 235 is a bar which indicates the number of times of the operation for which the high evaluation is given by the evaluation system 113. The operation for which the high evaluation is given is, for example, the operation for which the evaluation score calculated by the evaluation system 113 is higher than the first threshold. The evaluation indicator 235 extends in the X direction as the driving operation for which the high evaluation is given by the evaluation system 113 increases. Further, the number of times indicated by the evaluation indicator 235 is reduced corresponding to the number of times of the operation for which the evaluation score lower than the second threshold is given by the evaluation system 113, and the evaluation indicator 235 becomes short.

The length of the evaluation indicator 235 corresponds to a condition when the evaluation system 113 changes the level. The length of the evaluation indicator 235 becoming the maximum corresponds to that the condition for the evaluation system 113 to change the set level to a higher level is satisfied. The length of the evaluation indicator 235 becoming the shortest corresponds to that the condition for the evaluation system 113 to change the set level to a lower level is satisfied.

The evaluation indicator 235 easily understandably reports the evaluation given by the evaluation system 113 for the operation by the user to the user by the length of the bar. Therefore, the user can easily and intuitively recognize how the operation by the user is evaluated at a current evaluation level by visually recognizing the evaluation indicator 235.

3. Operations of Driving Evaluation System

Figure 6:
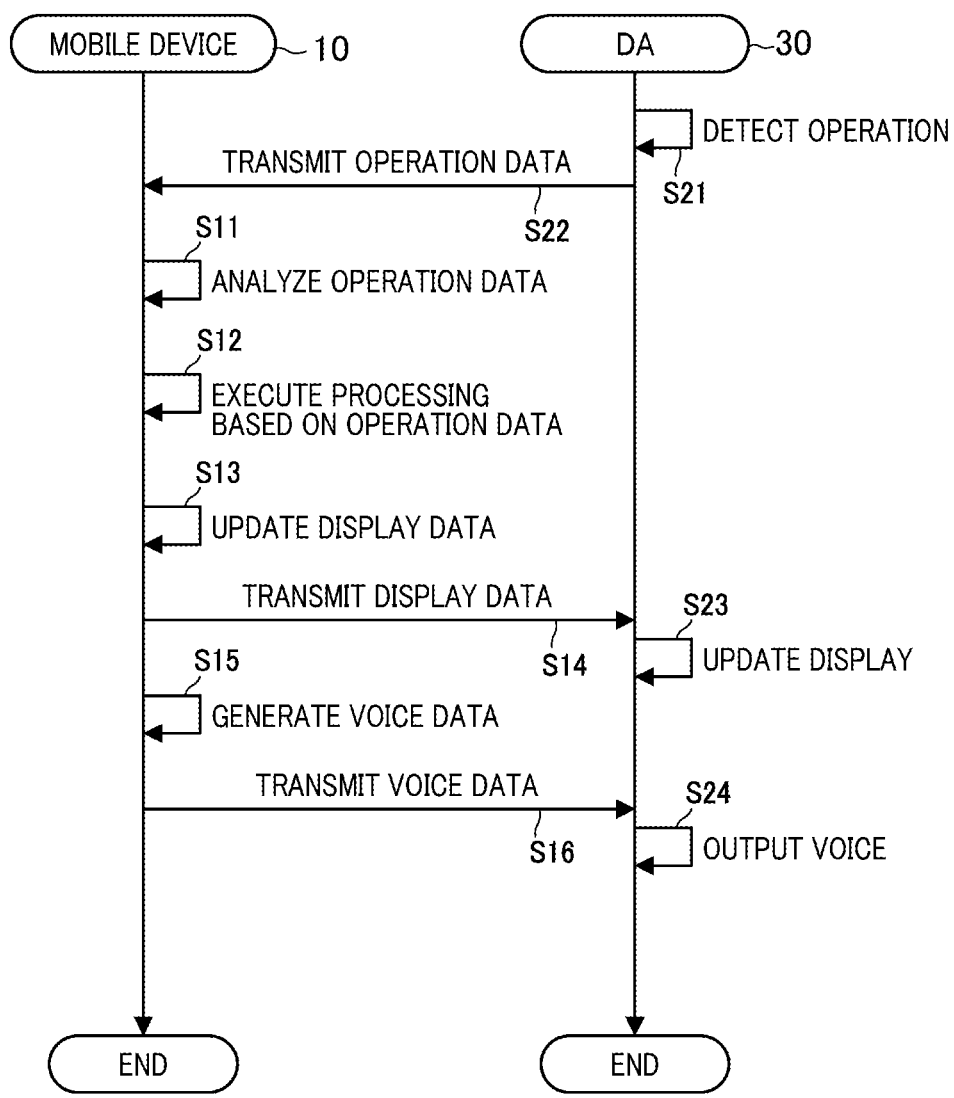
FIG. 6 is a sequence diagram illustrating operations of the driving evaluation system.

FIG. 6 is a sequence diagram illustrating operations of the driving evaluation system 1, and illustrates basic operations of the mobile device 10 and the DA 30. Steps S11-S15 in FIG. 6 are executed by the processor 11 of the mobile device 10. Steps S21-S24 are executed by the DA processor 31 of the DA 30.

When the operation by the user is detected (step S21), the DA 30 transmits operation data indicating operation contents to the mobile device 10 (step S22). The operation detected in step S21 is, for example, the operation to the input area 210 or the operation by the switches 41 and 42.

When the operation data transmitted by the DA 30 is received, the mobile device 10 analyzes the operation data (step S11). The mobile device 10 executes the processing based on the operation data (step S12). In step S12, for example, the start of the evaluation by the evaluation system 113, the change of the level of the evaluation in the evaluation system 113, and setting of the type of the operation to be an evaluation target or the like are performed. In addition, step S12 includes execution of the evaluation by the evaluation system 113.

The mobile device 10 updates the display data for performing the display on the touch panel 34 based on the result of the processing in step S12 (step S13). The mobile device 10 transmits the display data to the DA 30 (step S14). In addition, when outputting the voice based on the result of the processing in step S12, the mobile device 10 generates the voice data (step S15). The mobile device 10 transmits the generated voice data to the DA 30 (step S16).

The DA 30 receives the display data transmitted by the mobile device 10 and updates the display of the touch panel 34 based on the received display data (step S23). In addition, when the voice data transmitted by the mobile device 10 is received, the DA 30 outputs the voice from the speaker 43 based on the received voice data (step S24).

In this way, in the driving evaluation system 1, for the mobile device 10 and the DA 30, the mobile device 10 executes the processing according to the input to the DA 30 and the DA 30 executes display update and voice output based on the processing result.

Figure 7:
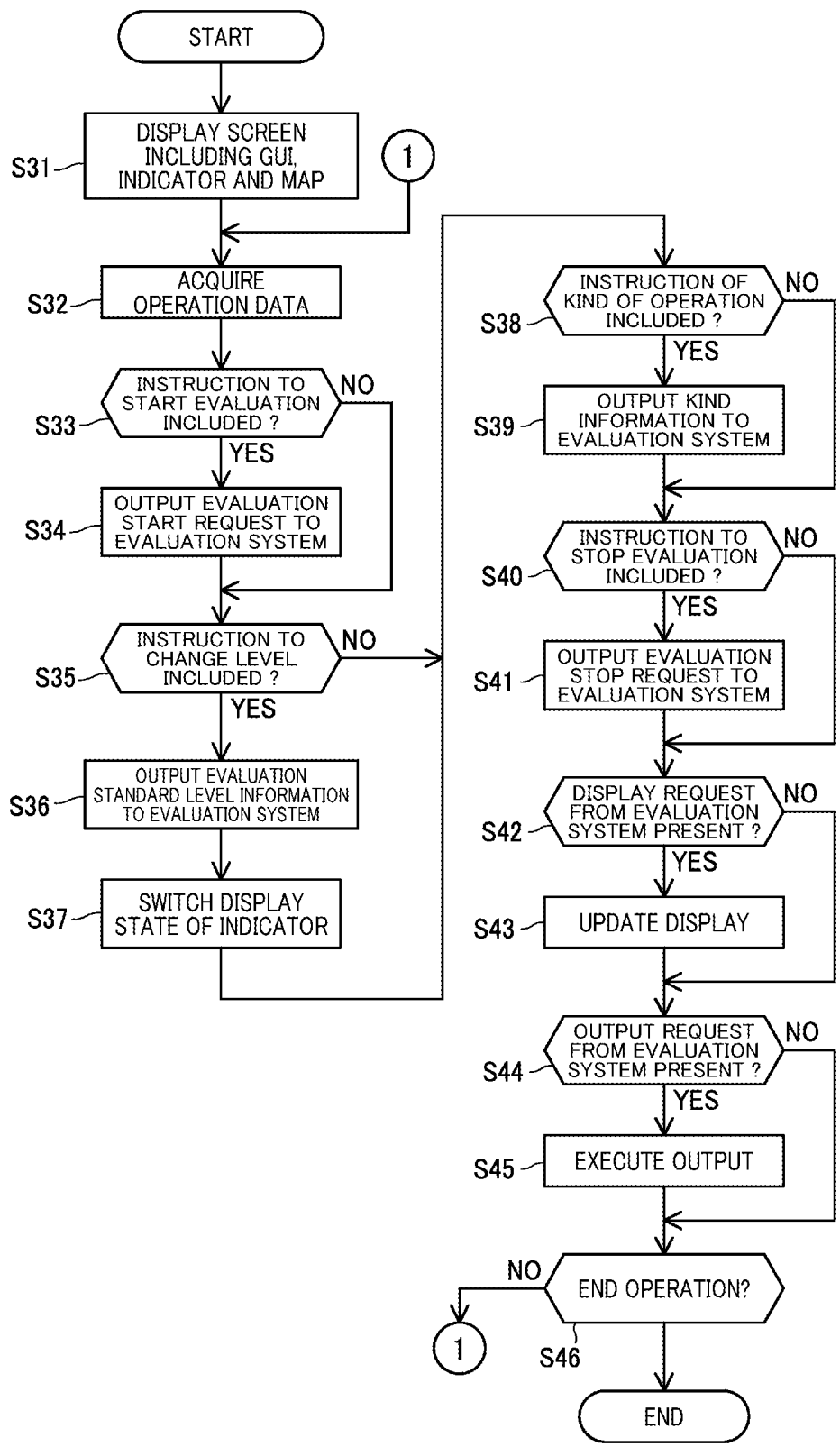
FIG. 7 is a flowchart illustrating the operations of the driving evaluation system.

FIG. 7 is a flowchart illustrating the operations of the driving evaluation system 1. FIG. 7 illustrates the operations including the display of the screen 200.

The operations in FIG. 7 are started when the mobile device 10 activates the DA control application 122, for example. When starting the operations in FIG. 7, the communication line 37 needs to be connected or established between the second communication device 13 and the first communication device 33. Further, when executing the operations in FIG. 7, the evaluation application 123 is preferably activated in the mobile device 10.

The output control unit 112 displays the screen 200 including the graphical user interfaces in the input area 210, the indicator 230 and the map 241 on the touch panel 34 (step S31). In step S31, the output control unit 112 generates the display data for displaying the screen 200, transmits the display data to the DA 30, and displays the screen 200 on the touch panel 34.

The input control unit 111 acquires the operation data by receiving the operation data transmitted by the DA 30 (step S32).

The input control unit 111 determines whether or not the acquired operation data includes the operation of instructing the evaluation start (step S33). The operation of instructing the evaluation start is the operation to the execution instruction input unit 223, for example. When it is determined that the operation of instructing the evaluation start is included (step S33; YES), the input control unit 111 outputs an evaluation start request to the evaluation system 113 (step S34) and shifts to step S35. Further, when it is determined that the operation of instructing the evaluation start is not included (step S33; NO), the input control unit 111 skips step S34 and shifts to step S35.

In step S35, the input control unit 111 determines whether or not the operation data acquired in step S32 includes the operation of instructing the level change of the evaluation (step S35). The operation of instructing the level change of the evaluation is, for example, the operation to the up instruction button 221 and the operation to the down instruction button 222. The operation may be the operation of the switches 41 and 42.

When it is determined that the operation of instructing the level change is included (step S35; YES), the input control unit 111 outputs evaluation standard level information to the evaluation system 113 (step S36). The evaluation standard level information is the information which specifies the level of the evaluation, and is the information for setting the level of the evaluation in the evaluation system 113. In step S36, the input control unit 111 generates the evaluation standard level information for changing the level of the evaluation in the evaluation system 113 just as instructed by the operation by the user, and outputs the evaluation standard level information to the evaluation system 113. The input control unit 111 switches a display state of the indicator 230 on the screen 200 displayed by the touch panel 34 (step S37). In step S37, the input control unit 111 changes the display state of the indicator 230 to correspond to the level indicated by the evaluation standard level information. Specifically, the input control unit 111 generates the display data including the indicator 230 corresponding to the changed level and transmits the display data to the DA 30 to update the display of the screen 200 by the touch panel 34. After executing step S37, the input control unit 111 shifts to step S38. Further, when it is determined that the operation of instructing the level change is not included (step S35; NO), the input control unit 111 skips steps S36-S37 and shifts to step S38.

In step S38, the input control unit 111 determines whether or not the operation data acquired in step S32 includes the operation of instructing the kind of the operation to be the evaluation target (step S38). The operation of instructing the kind of the operation to be the evaluation target is, for example, the operation to the operation type input unit 224.

When it is determined that the operation of instructing the kind of the operation is included (step S38; YES), the input control unit 111 outputs kind information to the evaluation system 113 (step S39). The kind information is the information which specifies the kind or the type of the operation to be the evaluation target. In step S39, the input control unit 111 generates the kind information for setting the operation of the kind instructed by the operation by the user as the evaluation target of the evaluation system 113, and outputs the kind information to the evaluation system 113. After executing step S39, the input control unit 111 shifts to step S40. Further, when it is determined that the operation of instructing the kind of the operation is not included (step S38; NO), the input control unit 111 skips step S39 and shifts to step S40.

In step S40, the input control unit 111 determines whether or not the operation data acquired in step S32 includes the operation of instructing the stop of the evaluation (step S40). The operation of instructing the stop of the evaluation is, for example, the operation to the execution instruction input unit 223.

When it is determined that the operation of instructing the stop of the evaluation is included (step S40; YES), the input control unit 111 outputs an evaluation stop request to the evaluation system 113 (step S41) and shifts to step S42. When it is determined that the stop of the evaluation is not included (step S40; NO), the input control unit 111 skips step S41 and shifts to step S42.

In step S42, the output control unit 112 determines whether or not the display is requested from the evaluation system 113 (step S42). When it is determined that the display is requested from the evaluation system 113 (step S42; YES), the output control unit 112 updates the display of the touch panel 34 based on the display request (step S43). In step S43, the output control unit 112 generates the display data for displaying an evaluation result and/or the advice generated by the evaluation system 113 on the touch panel 34 and transmits the display data to the DA 30 to update the display of the screen 200, for example. In this case, for example, a character string which reports the evaluation result and the advice is superimposed on the map 241 of the screen 200 and displayed.

After executing step S43, the output control unit 112 shifts to step S44. Further, when it is determined that the display is not requested from the evaluation system 113 (step S42; NO), the output control unit 112 skips step S43 and shifts to step S44.

In step S44, the output control unit 112 determines whether or not output is requested from the evaluation system 113 (step S44). When it is determined that the output is requested by the evaluation system 113 (step S44; YES), the output control unit 112 executes the output by the DA 30 based on the output request (step S45). For example, in step S45, the output control unit 112 generates the voice data based on the output request generated by the evaluation system 113 and transmits the voice data to the DA 30 to output the voice from the speaker 43. In this case, for example, the voice which reports the evaluation result and the advice generated by the evaluation system 113 is outputted.

After executing step S45, the output control unit 112 shifts to step S46. Further, when it is determined that the output is not requested from the evaluation system 113 (step S44; NO), the output control unit 112 skips step S45 and shifts to step S46.

In step S46, the mobile device 10 determines whether or not to end the operation of the DA control application 122 (step S46). Examples of the case of ending the operation of the DA control application 122 are the case where the user operates the mobile device 10 and instructs the end of the DA control application 122, the case where the communication by the communication line 37 is interrupted, the case where the DA 30 stops the operation and the case where a power source of the DA 30 is turned off. The case where the power source of the DA 30 is turned off is, for example, the case where an ignition of the vehicle V is turned off.

When ending the operation of the DA control application 122 (step S46; YES), the mobile device 10 ends the operations in FIG. 7. When not ending the operation of the DA control application 122 (step S46; NO), the mobile device 10 returns to step S32.

Figure 8:
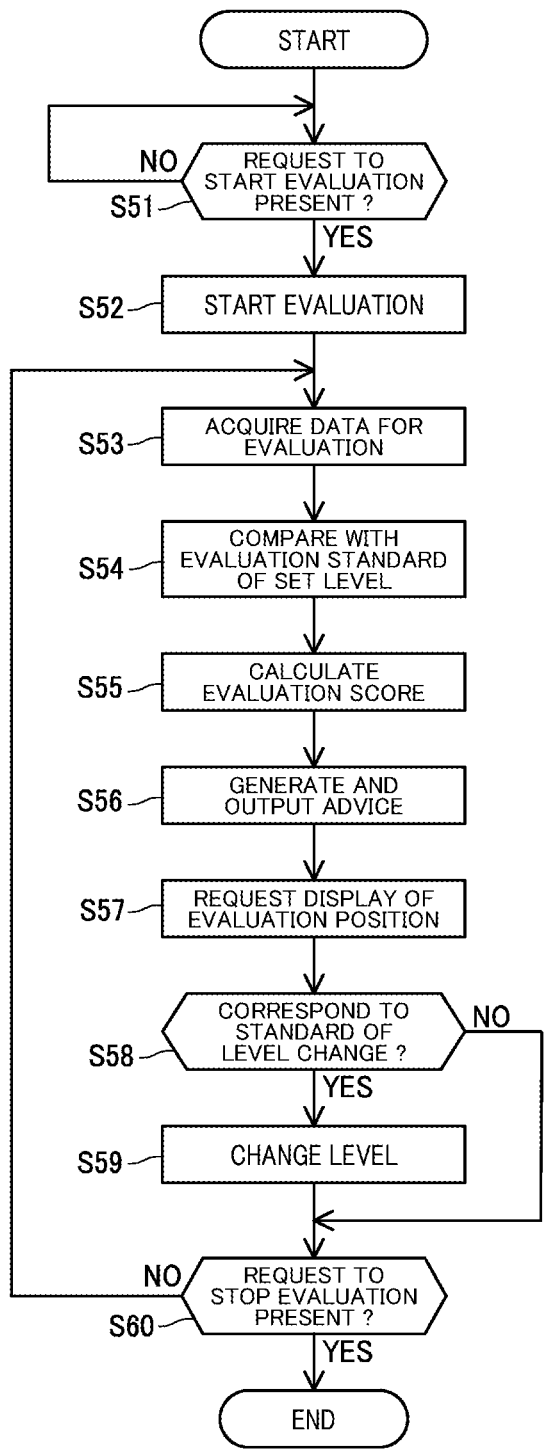
FIG. 8 is a flowchart illustrating the operations of the driving evaluation system.

FIG. 8 is a flowchart illustrating the operations of the driving evaluation system 1. FIG. 8 illustrates evaluation processing executed by the evaluation system 113.

The evaluation system 113 determines whether or not an evaluation start request is inputted (step S51) and stands by while the evaluation start request is not inputted (step S51; NO). When the evaluation start request is inputted (step S51; YES), the evaluation system 113 starts the evaluation (step S52). The evaluation system 113 acquires data for the evaluation (step S53). In step S53, the evaluation system 113 acquires a detection value of the IMU 14 for example. The evaluation system 113 may acquire the position information detected by the GNSS 15 in step S53. The evaluation system 113 may acquire the data which is acquired from the ECU 50 by the mobile device 10 and indicates the operation amount of the accelerator pedal, the throttle opening degree, the operation amount of the brake pedal and the steering angle of the steering wheel 62 or the like, in step S53. The evaluation system 113 acquires the data corresponding to the type of the operation which is the evaluation target set in the evaluation system 113, in step S53.

The evaluation system 113 compares the data acquired in step S53 with the evaluation standard of the level set in the evaluation system 113 (step S54). The evaluation system 113 calculates the evaluation score for the operation by the user based on the result of comparison in step S54 (step S55).

The evaluation system 113 generates and outputs the advice to the user based on the evaluation score calculated in step S55 (step S56). In step S56, the evaluation system 113 generates the display request for displaying the advice on the touch panel 34 or the output request for outputting the advice from the DA 30 as the voice or the like, and outputs the request to the output control unit 112.

The evaluation system 113 generates the display request and outputs the display request to the output control unit 112 in order to display the evaluation position icon 242 at the position where the operation has been performed, the position being indicated by the data acquired in step S53 (step S57). Thus, the evaluation position icon 242 is superimposed on the map 241 and displayed.

The evaluation system 113 determines whether or not the evaluation of the driving operation by the user corresponds to the standard of the level change (step S58). The evaluation system 113 defines the evaluation score calculated in step S55 or a cumulative value or an average value of the evaluation scores calculated in the past as an index of determination, for example. When the index of the determination is higher than a predetermined raising standard set beforehand, the evaluation system 113 determines that the evaluation corresponds to the standard to change the level set in the evaluation system 113 to a higher level. Further, when the index of the determination is lower than a predetermined lowering standard set beforehand, the evaluation system 113 determines that the evaluation corresponds to the standard to change the level set in the evaluation system 113 to a lower level.

In addition, for example, the evaluation system 113 counts the number of times of the operation for which the evaluation system 113 has calculated the evaluation score higher than the first threshold. When there is the operation for which the evaluation system 113 has calculated the evaluation score lower than the second threshold, the evaluation system 113 reduces a count value for the number of times of the operation. When the count value reaches a preset upper limit, the evaluation system 113 determines that the evaluation corresponds to the standard to change the level of the evaluation in the evaluation system 113 to a higher level. Further, when the count value reaches a preset lower limit, the evaluation system 113 determines that the evaluation corresponds to the standard to change the level of the evaluation to a lower level.

When the driving evaluation system 1 displays the screen 201 by the touch panel 34, the count value of the evaluation system 113 corresponds to the length of the bar of the evaluation indicator 235, and the upper limit and the lower limit of the count value correspond to the upper limit and the lower limit of the length of the evaluation indicator 235, for example. In this case, the evaluation system 113 may request the update of the display of the evaluation indicator 235 on the screen 201 every time of changing the count value. In this case, according to the display request of the evaluation system 113, the display is updated in step S43 and the length of the bar of the evaluation indicator 235 is changed.

In the case of determining that the evaluation corresponds to the standard of the level change (step S58; YES), the evaluation system 113 changes the level set in the evaluation system 113 (step S59) and shifts to step S60. In the case of determining that the evaluation does not correspond to the standard of the level change (step S58; NO), the evaluation system 113 skips step S59 and shifts to step S60.

In step S60, the evaluation system 113 determines whether or not the evaluation stop request is inputted (step S60). When it is determined that the evaluation stop request is inputted (step S60; YES), the evaluation system 113 ends the present processing. When it is determined that the evaluation stop request is not inputted (step S60; NO), the evaluation system 113 returns to step S53.

While the configuration of performing the evaluation by the evaluation system 113 by the mobile device 10 executing the evaluation application 123 is explained in the embodiment described above, the driving evaluation system 1 may be configured such that a device different from the interface device 2 performs the evaluation.

Figure 9:
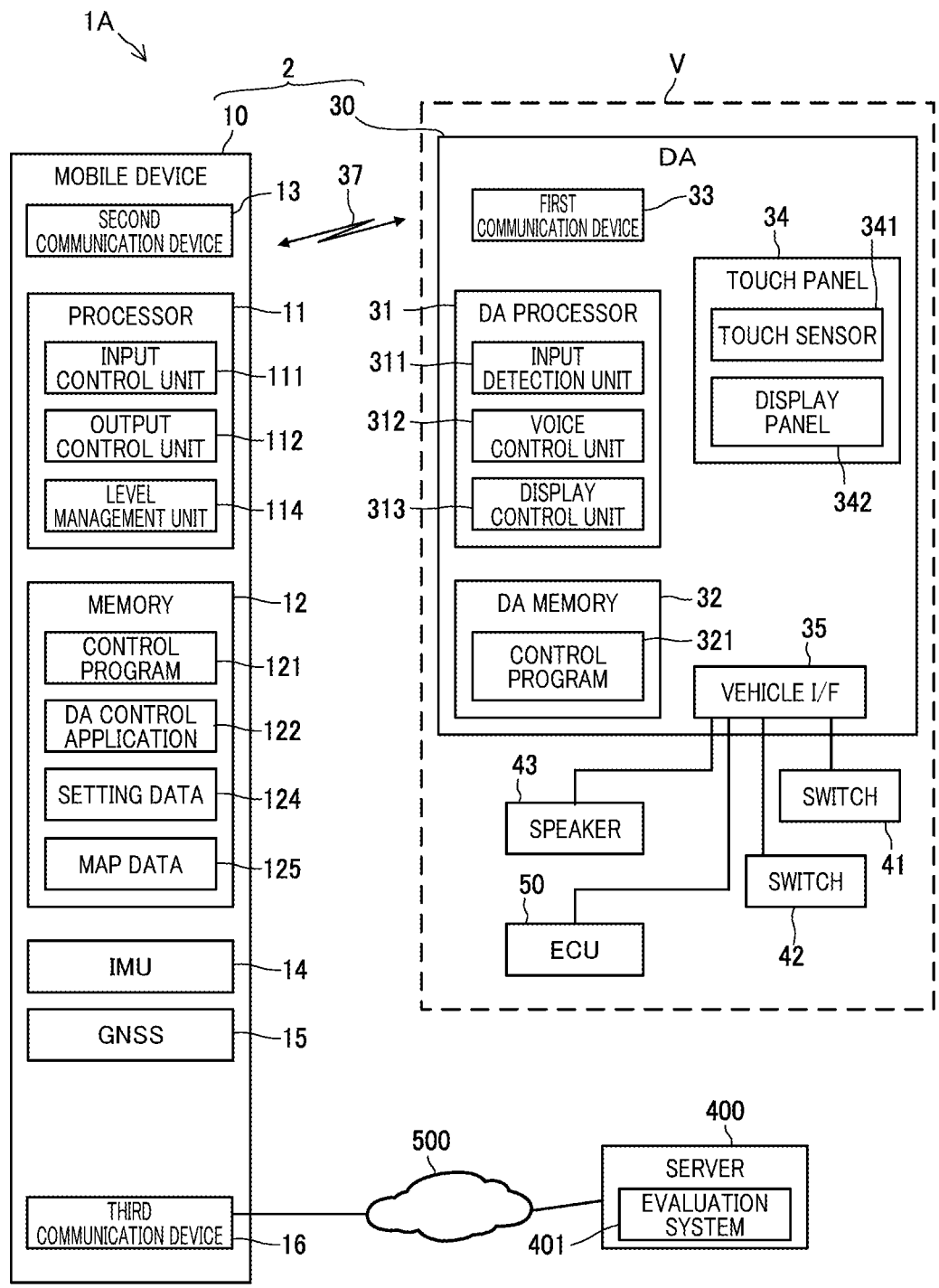
FIG. 9 is a diagram illustrating another configuration example of the driving evaluation system.

FIG. 9 is a diagram illustrating the configuration of a driving evaluation system 1A as another configuration example of the driving evaluation system 1.

For the driving evaluation system 1A, the server 400 includes an evaluation system 401 in the driving evaluation system 1. Since the mobile device 10 does not perform the evaluation, the evaluation application 123 may not be installed. That is, in the mobile device 10, the processor 11 may not function as the evaluation system 113. In addition, the memory 12 may not store the evaluation application 123.

In the configuration in FIG. 9, the evaluation system 401 executes the operations in FIG. 8. The evaluation system 401 is realized by a non-illustrated server processor provided in the server 400 executing an application program similar to the evaluation application 123. In the configuration, the mobile device 10 executes the operations in FIG. 7 by the functions of the input control unit 111, the output control unit 112 and the level management unit 114. That is, the mobile device 10 transmits the evaluation start request to the server 400 through the third communication device 16 in step S34. Similarly, the mobile device 10 transmits the evaluation standard level information, the kind information and the evaluation stop request or the like to the server 400 through the third communication device 16 in steps S36, S39 and S41. In addition, the mobile device 10 detects the output request and the display request from the evaluation system 401 by receiving the data transmitted from the server 400 through the third communication device 16. In this way, when executing the evaluation of the driving operation by the user by utilizing the server 400, more highly accurate evaluation can be performed without increasing processing loads of the mobile device 10.

4. Other Embodiments

The embodiment described above illustrates one specific example of applying the present invention, and does not limit a form of applying the invention.

In the embodiment described above, the vehicle V is illustrated as the moving object which is the operation object and FIG. 2 illustrates the example that the vehicle V is a four-wheel automobile, by way of example. The moving object may be a unicycle, a bicycle, a motorcycle or other vehicles. The moving object may be a ship or an aircraft. The moving object may be an object that the user rides or may be an object that the user does not ride. A drive source of the moving object may be one of an internal combustion engine, a motor and human power or may include other drive sources.

The embodiment described above illustrates the configuration that the DA 30 includes the display panel 342 as a display, by way of example. For example, the DA 30 may be a head-up display which projects videos and images on a windshield of the vehicle V or other projection boards. In this case, as the up instruction input unit and the down instruction input unit, the switches 41 and 42 may be used. Alternatively, the DA 30 may include a microphone and may be able to receive command input by user's voice collected by the microphone. In this case, the DA 30 may utilize the microphone as the up instruction input unit and the down instruction input unit, and receive the instruction to change the level of the evaluation in the evaluation system 113.

The embodiment described above explains that the mobile device 10 and the DA 30 are separately configured, by way of example. For example, the mobile device 10 and the DA 30 may be integrally configured. In this case, the first communication device 33 and the second communication device 13 correspond to a communication interface inside an integrated device.

FIG. 1 is a schematic diagram in which functional configurations of the individual devices included in the driving evaluation system 1 are divided depending on main processing contents and illustrated in order to facilitate understanding of the claimed invention, and does not limit the configurations of the individual devices.

The control program 121, the DA control application 122 and the evaluation application 123 can be moved and/or dealt in the state of being stored in a portable or fixed information storage medium. The information storage medium is an example of a non-transitory computer-readable storage medium. Examples of the information storage medium are a magnetic storage medium such as a hard disk, an optical storage medium such as a CD, and a semiconductor storage device such as a USB memory and an SSD (Solid State Drive), and the other storage media can be also used. The processor 11 may read and execute the control program 121, the DA control application 122 or the evaluation application 123 from the information storage medium described above.

5. Configurations Supported by Embodiments Described Above

The embodiment described above is a specific example of the following configurations.

(Configuration 1) An interface device which supports information transmission between an evaluation system that evaluates an operation by a user to an operation object and the user, the interface device including: a display configured to display information to the user; an instruction input unit configured to receive an instruction by the user; and a processor configured to execute processing of displaying, on the display, a level display unit which displays a level of an evaluation standard for the operation by the user in the evaluation system, processing of switching display of the level display unit according to an up or down instruction of the level inputted to the instruction input unit, and processing of outputting evaluation standard level information indicating the level corresponding to the display of the level display unit to the evaluation system.

According to the interface device of configuration 1, the operation by the user to the operation object can be appropriately evaluated corresponding to operation ability of the user. In addition, the user can select or specify the level by an easy operation. Thus, an experience of evaluating the operation ability of the user can be provided with a small operation burden, thereby contributing to developing a sustainable transportation system.

(Configuration 2) The interface device according to configuration 1, wherein the operation object is a moving object, and the evaluation standard indicates strictness of evaluation for a driving operation of the moving object by the user.

According to the interface device of configuration 2, the driving operation of the moving object performed by the user can be appropriately determined based on the evaluation standard for which strictness is different depending on the level.

(Configuration 3) The interface device according to configuration 1 or configuration 2, wherein the instruction input unit includes an up instruction input unit to which an up instruction of the level by the user is inputted, and a down instruction input unit to which a down instruction of the level by the user is inputted.

According to the interface device of configuration 3, since the user can easily input the up instruction and the down instruction of the level, operability can be further improved.

(Configuration 4) The interface device according to configuration 3, wherein the up instruction input unit, the down instruction input unit and the level display unit are arranged to be lined up on a straight line.

According to the interface device of configuration 4, the user can easily give the up instruction and the down instruction of the level while looking at the level display unit. Therefore, an intuitive operation by the user is made possible and the operability can be further improved.

(Configuration 5) The interface device according to any one of configuration 1 to configuration 4, wherein the processor displays, on the display, an indicator including a bar a length of which is set corresponding to the level, as the level display unit.

According to the interface device of configuration 5, the level of evaluating the operation by the user can be presented to the user in a form easily and intuitively understandable for the user. Thus, the operability regarding the evaluation can be improved.

(Configuration 6) The interface device according to any one of configuration 1 to configuration 5, wherein the processor displays the bar which extends in a first direction on the display every time the level goes up, the instruction input unit includes an up instruction input unit to which an up instruction of the level by the user is inputted, and a down instruction input unit to which a down instruction of the level by the user is inputted, the up instruction input unit and the down instruction input unit are lined up in the first direction, and the up instruction input unit is arranged to be positioned on a side where the bar extends.

According to the interface device of configuration 6, the up instruction input unit and the down instruction input unit used for changing the level of the evaluation are lined up and arranged to correspond to the direction of the bar of the indicator indicating the level of the evaluation. Thus, since the operation that the user changes the level of the evaluation becomes an easier operation, the operability can be further improved.

(Configuration 7) The interface device according to configuration 6, wherein the up instruction input unit, the down instruction input unit and the indicator are arranged to be lined up on a straight line.

According to the interface device of configuration 7, the user can easily give the up instruction and the down instruction of the level while looking at the indicator. Therefore, the intuitive operation by the user is made possible and the operability can be further improved.

(Configuration 8) The interface device according to any one of configuration 1 to configuration 7, wherein the instruction input unit includes an execution instruction input unit configured to receive an operation for instructing either start or stop of evaluation of the operation, and the execution instruction input unit is positioned between the up instruction input unit and the down instruction input unit.

According to the interface device of configuration 8, the user can instruct the start and stop of the evaluation by an easy operation utilizing the execution instruction input unit. Then, since the up instruction input unit and the down instruction input unit for performing the operation of changing the level of the evaluation and the execution instruction input unit for instructing the start and stop of the evaluation are lined up and arranged in an easily intuitively understandable order, the operability regarding the evaluation can be further improved.

(Configuration 9) The interface device according to configuration 4, wherein the display is a touch panel including a display panel and a touch sensor which is the instruction input unit arranged on a surface of the display panel, and the processor displays an up instruction button which is the up instruction input unit and a down instruction button which is the down instruction input unit on the display at positions holding the bar in between in the first direction.

According to the interface device of configuration 9, by utilizing the up instruction button and the down instruction button arranged on the touch panel, the user can easily perform the operation of changing the level of the evaluation.

(Configuration 10) The interface device according to configuration 8 or configuration 9, wherein the processor displays graphical user interfaces corresponding to the up instruction input unit, the down instruction input unit and the execution instruction input unit respectively on one screen by the display.

According to the interface device of configuration 10, since the up instruction input unit, the down instruction input unit and the execution instruction input unit are the graphical user interfaces arranged on one screen, the operation by the user is made easier and the operability can be improved.

(Configuration 11) The interface device according to configuration 10, wherein the processor displays the indicator on the one screen of the display.

According to the interface device of configuration 11, the indicator is displayed on the display together with the up instruction input unit, the down instruction input unit and the execution instruction input unit. Therefore, the user can perform the operation of the level change by the touch panel while looking at the indicator. Thus, the operation by the user regarding the evaluation is made easier and the operability can be improved.

(Configuration 12) The interface device according to configuration 10 or configuration 11, wherein the processor displays a map corresponding to a position of the operation object on the one screen of the display.

According to the interface device of configuration 12, the user can recognize the position of the operation object by the map. Therefore, since a situation where the user can easily perform the operation is produced by effectively assisting the operation by the user, the skill of the user can be appropriately evaluated.

(Configuration 13) The interface device according to any one of configuration 10 to configuration 12, wherein the processor displays a map corresponding to a position of the operation object on the one screen of the display, and displays, on the map, a display object indicating a position where the operation has been performed.

According to the interface device of configuration 13, the user can specifically understand the operation turned to the target of the evaluation. Thus, the evaluation for the operation by the user can be utilized to improve the ability of the user.

(Configuration 14) The interface device according to any one of configuration 1 to configuration 13, wherein the instruction input unit includes an operation type input unit configured to receive a selection of a kind of the operation to be a target of evaluation, and the processor executes processing of outputting kind information indicating the kind of the operation selected by the operation type input unit to the evaluation system.

According to the interface device of configuration 14, among the operations performed by the user to the operation object, the target of the evaluation can be limited to the operation of a specified kind. Thus, the evaluation for the operation by the user can be easily utilized to improve the ability of the user.

(Configuration 15) The interface device according to any one of configuration 1 to configuration 14, including an output unit, wherein the processor executes processing of outputting, from the output unit, advice based on a result of evaluating the operation.

According to the interface device of configuration 15, the result of evaluating the operation by the user can be effectively fed back to the user, thereby contributing to improving the ability of the user.

(Configuration 16) The interface device according to any one of configuration 3 to configuration 15, including: a display device which includes the display and is loaded on the operation object; and a mobile device which includes the processor, wherein the display device includes a first communication device configured to communicate with the mobile device and a display processor configured to transmit operation data indicating an instruction received by the up instruction input unit and the down instruction input unit to the mobile device through the first communication device, the mobile device includes a second communication device configured to communicate with the display device, and the processor receives, through the second communication device, the operation data transmitted by the display device.

According to the interface device of configuration 16, the interface device which evaluates the operation by the user and is capable of easily performing the operation of changing the level of the evaluation can be realized by combining the display device and the mobile device.

(Configuration 17) The interface device according to any one of configuration 3 to configuration 15, including: a display device which includes the display and is loaded on the operation object; and a mobile device which includes the processor, wherein the display device includes a first communication device configured to communicate with the mobile device and a display processor configured to transmit operation data indicating an instruction received by the up instruction input unit and the down instruction input unit to the mobile device through the first communication device, the mobile device includes a second communication device configured to communicate with the display device and a third communication device configured to communicate with the evaluation system, and the processor executes processing of receiving, through the second communication device, the operation data transmitted by the display device, processing of generating the evaluation standard level information based on the received operation data, and processing of transmitting the evaluation standard level information to the evaluation system through the third communication device.

According to the interface device of configuration 17, the interface device which utilizes the evaluation system for evaluating the operation by the user and is capable of easily performing the operation of changing the level of the evaluation can be realized by combining the display device and the mobile device. In addition, by utilizing the third communication device of the mobile device, the result of the evaluation executed by the evaluation system can be easily utilized.

(Configuration 18) An output method which supports information transmission between an evaluation system that evaluates an operation by a user to an operation object and the user, the output method executing, by an interface device including a display configured to display information to the user and an instruction input unit configured to receive an instruction by the user, processing of displaying, on the display, a level display unit which displays a level of an evaluation standard for the operation by the user in the evaluation system, processing of switching display of the level display unit according to an up or down instruction of the level inputted to the instruction input unit, and processing of outputting evaluation standard level information indicating the level corresponding to the display of the level display unit to the evaluation system.

According to the output method of configuration 18, the operation by the user to the operation object can be appropriately evaluated corresponding to the operation ability of the user. In addition, the user can select or specify the level by an easy operation. Thus, the experience of evaluating the operation ability of the user can be provided with a small operation burden, thereby contributing to developing the sustainable transportation system.

(Configuration 19) A non-transitory computer-readable storage medium storing a program which is to be executed by a processor of an interface device including a display configured to display information to a user and an instruction input unit configured to receive an instruction by the user and supports information transmission between an evaluation system that evaluates an operation by the user to an operation object and the user, the storage medium storing the program that executes, by the processor, processing of displaying, on the display, a level display unit which displays a level of an evaluation standard for the operation by the user in the evaluation system, processing of switching display of the level display unit according to an up or down instruction of the level inputted to the instruction input unit, and processing of outputting evaluation standard level information indicating the level corresponding to the display of the level display unit to the evaluation system.

By executing the program stored in the storage medium of configuration 19, the operation by the user to the operation object can be appropriately evaluated corresponding to the operation ability of the user. In addition, the user can select or specify the level by an easy operation. Thus, the experience of evaluating the operation ability of the user can be provided with a small operation burden, thereby contributing to developing the sustainable transportation system.

REFERENCE SIGNS LIST 1, 1A . . . driving evaluation system, 2 . . . interface device, 10 . . . mobile device, 11 . . . processor, 12 . . . memory, 13 . . . second communication device, 14 . . . IMU, 15 . . . GNSS, 16 . . . third communication device, 30 . . . display audio (display device), 31 . . . DA processor (display processor), 32 . . . DA memory, 33 . . . first communication device, 34 . . . touch panel (display, output unit), 35 . . . vehicle I/F, 37 . . . communication line, 41 . . . switch (up instruction input unit), 42 . . . switch (down instruction input unit), 43 . . . speaker (output unit), 50 . . . ECU, 111 . . . input control unit, 112 . . . output control unit, 113 . . . evaluation system, 114 . . . level management unit, 121 . . . control program, 122 . . . DA control application, 123 . . . evaluation application, 124 . . . setting data, 125 . . . map data, 200, 201 . . . screen, 210, 211 . . . input area, 221 . . . up instruction button (up instruction input unit, instruction input unit), 222 . . . down instruction button (down instruction input unit, instruction input unit), 223 . . . execution instruction input unit (instruction input unit), 224 . . . operation type input unit (instruction input unit), 230 . . . indicator (level display unit), 231 . . . level display unit, 235 . . . evaluation indicator, 241 . . . map, 242 . . . evaluation position icon (display object), 243 . . . current position icon, 250 . . . operation type selection area, 311 . . . input detection unit, 312 . . . voice control unit, 321 . . . control program, 341 . . . touch sensor, 342 . . . display panel, 400 . . . server, 401 . . . evaluation system, 500 . . . communication network, V . . . vehicle (operation object, moving object).

What is claimed is:

1. An interface device which supports information transmission between an evaluation system that evaluates an operation by a user to an operation object and the user, the interface device comprising:
    a display configured to display information to the user;
    a switch configured to receive an instruction by the user; and
    a processor configured to execute processing of displaying, on the display, an indicator which displays a level of an evaluation standard for the operation by the user in the evaluation system, processing of switching display of the indicator according to an up or down instruction of the level inputted to the switch, and processing of outputting evaluation standard level information indicating the level corresponding to the display of the indicator to the evaluation system,
    wherein
    the operation object is a moving object, and
    the level of the evaluation standard indicates strictness of evaluation for a driving operation of the moving object by the user, and the level of the evaluation standard is a level according to a degree of skill of the driving operation of the user,
    when the driving operation by the user is evaluated, the processor:
        changes the level of the evaluation standard set to a level at least one level higher in a case where an evaluation score is higher than a first standard;
        changes the level of the evaluation standard set to a level at least one level lower in a case where the evaluation score is lower than a second standard; and
        changes the display of the indicator and evaluation standard level information indicating the level corresponding to the display of the indicator according to the level changed corresponding to the evaluation score.

2. The interface device according to claim 1,
    wherein the switch includes an up button to which the up instruction of the level by the user is inputted, and a down button to which the down instruction of the level by the user is inputted.

3. The interface device according to claim 2,
    wherein the up button, the down button and the indicator are arranged to be lined up on a straight line.

4. The interface device according to claim 2, comprising:
a display device which includes the display and is loaded on the operation object; and
a mobile device which includes the processor,
wherein the display device includes
a first communication device configured to communicate with the mobile device and
a display processor configured to transmit operation data indicating an instruction received by the up button and the down button to the mobile device through the first communication device,
the mobile device includes a second communication device configured to communicate with the display device, and
the processor receives, through the second communication device, the operation data transmitted by the display device.

5. The interface device according to claim 2, comprising:
a display device which includes the display and is loaded on the operation object; and
a mobile device which includes the processor,
wherein the display device includes
a first communication device configured to communicate with the mobile device and
a display processor configured to transmit operation data indicating an instruction received by the up button and the down button to the mobile device through the first communication device,
the mobile device includes
a second communication device configured to communicate with the display device and
a third communication device configured to communicate with the evaluation system, and
the processor executes processing of receiving, through the second communication device, the operation data transmitted by the display device, processing of generating the evaluation standard level information based on the received operation data, and processing of transmitting the evaluation standard level information to the evaluation system through the third communication device.

6. The interface device according to claim 1,
wherein the processor displays, on the display, the indicator including a bar a length of which is set corresponding to the level.

7. The interface device according to claim 6,
wherein the processor displays the bar which extends in a first direction on the display every time the level goes up,
the switch includes an up button to which the up instruction of the level by the user is inputted, and a down button to which the down instruction of the level by the user is inputted,
the up button and the down button are lined up in the first direction, and the up button is arranged to be positioned on a side where the bar extends.

8. The interface device according to claim 7,
wherein the up button, the down button and the indicator are arranged to be lined up on a straight line.

9. The interface device according to claim 8,
wherein the switch includes an execution button configured to receive an operation for instructing either start or stop of evaluation of the operation, and
the execution button is positioned between the up button and the down button.

10. The interface device according to claim 9,
wherein the processor displays graphical user interfaces corresponding to the up button, the down button and the execution button respectively on one screen by the display.

11. The interface device according to claim 10,
wherein the processor displays the indicator on the one screen of the display.

12. The interface device according to claim 10,
wherein the processor displays a map corresponding to a position of the operation object on the one screen of the display.

13. The interface device according to claim 10,
wherein the processor
displays a map corresponding to a position of the operation object on the one screen of the display, and
displays, on the map, a display object indicating a position where the operation has been performed.

14. The interface device according to claim 7,
wherein the display is a touch panel including a display panel and a touch sensor which is the switch arranged on a surface of the display panel, and
the processor displays the up button and the down button on the display at positions holding the bar in between in the first direction.

15. The interface device according to claim 1,
wherein the switch includes an operation type input unit configured to receive a selection of a kind of the operation to be a target of evaluation, and
the processor executes processing of outputting kind information indicating the kind of the operation selected by the operation type input unit to the evaluation system.

16. The interface device according to claim 1, comprising an output unit,
wherein the processor executes processing of outputting, from the output unit, advice based on a result of evaluating the operation.

17. An output method which supports information transmission between an evaluation system that evaluates an operation by a user to an operation object and the user, the output method executing,
by an interface device including a display configured to display information to the user and a switch configured to receive an instruction by the user,
processing of displaying, on the display, an indicator which displays a level of an evaluation standard for the operation by the user in the evaluation system,
processing of switching display of the indicator according to an up or down instruction of the level inputted to the switch, and
processing of outputting evaluation standard level information indicating the level corresponding to the display of the indicator to the evaluation system,
wherein
the operation object is a moving object,
the level of the evaluation standard indicates strictness of evaluation for a driving operation of the moving object by the user, and the level of the evaluation standard is a level according to a degree of skill of the driving operation of the user,
when the driving operation by the user is evaluated, the output method further includes executing:
changing the level of the evaluation standard set to a level at least one level higher in a case where an evaluation score is higher than a first standard;

changing the level of the evaluation standard set to a level at least one level lower in a case where the evaluation score is lower than a second standard; and changing the display of the indicator and evaluation standard level information indicating the level corresponding to the display of the indicator according to the level changed corresponding to the evaluation score.

18. A non-transitory computer-readable storage medium storing a program which is to be executed by a processor of an interface device including a display configured to display information to a user and a switch configured to receive an instruction by the user and supports information transmission between an evaluation system that evaluates an operation by the user to an operation object and the user, the storage medium storing the program that executes, by the processor, processing of displaying, on the display, an indicator which displays a level of an evaluation standard for the operation by the user in the evaluation system, processing of switching display of the indicator according to an up or down instruction of the level inputted to the switch, and processing of outputting evaluation standard level information indicating the level corresponding to the display of the indicator to the evaluation system, wherein the operation object is a moving object, the level of the evaluation standard indicates strictness of evaluation for a driving operation of the moving object by the user, and the level of the evaluation standard is a level according to a degree of skill of the driving operation of the user, when the driving operation by the user is evaluated, the program further executes processing of:

changing the level of the evaluation standard set to a level at least one level higher in a case where an evaluation score is higher than a first standard;

changing the level of the evaluation standard set to a level at least one level lower in a case where the evaluation score is lower than a second standard; and changing the display of the indicator and evaluation standard level information indicating the level corresponding to the display of the indicator according to the level changed corresponding to the evaluation score.

* * * * *